US008550793B2

(12) United States Patent
Goedecke et al.

(10) Patent No.: US 8,550,793 B2
(45) Date of Patent: Oct. 8, 2013

(54) FASTENING OF ROTOR MAGNETS ON THE SHAFT OF A COMPRESSOR ARRANGEMENT

(75) Inventors: Holger Goedecke, Achstetten (DE); Rudolf Loeffler, Unteressendorf (DE); Ralf Heber, Erbach-Ersingen (DE); Thomas Bischof, Illerbeuren (DE); Sandra Maier, Bad Wurznach (DE); Oliver Kaempfer, Mainz (DE)

(73) Assignees: Lindenmaier AG, Laupheim (DE); SycoTec GmbH & Co. KG, Leutkirch IM Alligau (DE)

( * ) Notice: Subject to any disclaimer, the term of this patent is extended or adjusted under 35 U.S.C. 154(b) by 724 days.

(21) Appl. No.: 12/601,690

(22) PCT Filed: Apr. 15, 2008

(86) PCT No.: PCT/EP2008/003197
§ 371 (c)(1),
(2), (4) Date: May 6, 2010

(87) PCT Pub. No.: WO2008/141710
PCT Pub. Date: Nov. 27, 2008

(65) Prior Publication Data
US 2010/0212643 A1      Aug. 26, 2010

(30) Foreign Application Priority Data

| May 24, 2007 | (EP) | 07075981 |
| May 24, 2007 | (EP) | 07090100 |
| Jun. 20, 2007 | (EP) | 07075496 |
| Aug. 1, 2007 | (EP) | 07075661 |

(51) Int. Cl.
*F04B 39/06* (2006.01)

(52) U.S. Cl.
USPC .......................................... 417/371; 417/366

(58) Field of Classification Search
USPC ............. 417/409, 371; 290/52; 60/606, 605.3
See application file for complete search history.

(56) References Cited

U.S. PATENT DOCUMENTS

| 1,420,076 | A | * | 6/1922 | Bouche et al. ................... 290/52 |
| 2,763,214 | A | * | 9/1956 | White ............................ 417/357 |
| 3,618,337 | A | * | 11/1971 | Mount ............................... 2/505 |
| 3,891,355 | A | * | 6/1975 | Hecht et al. .................... 417/371 |
| 4,253,031 | A | * | 2/1981 | Frister ............................. 290/52 |
| 5,060,720 | A | * | 10/1991 | Wollaber et al. .............. 165/122 |

(Continued)

FOREIGN PATENT DOCUMENTS

| EP | 0 642 210 | 3/1995 |
| GB | 895 616 | 5/1962 |

*Primary Examiner* — Charles Freay
*Assistant Examiner* — Alexander Comley
(74) *Attorney, Agent, or Firm* — Fay Kaplun & Marcin, LLP

(57) ABSTRACT

A compressor arrangement for compressing fresh air for internal combustion engines includes a compressor wheel and an electric motor having at least one stator and at least one rotor having a rotor magnet and a rotor gap between the rotor and stator. The rotor gap is designed such that when the compressor wheel rotates, at least 50%, of the air mass flow to be compressed is fed through the rotor gap. The compressor wheel is mounted on a shaft or contains the shaft and at least one rotor magnet or a carrier for holding the rotor magnet and is mountable as a separate part on said shaft and may be bolted, splinted, glued, shrunk, or secured by form-fit to said shaft to prevent rotation.

28 Claims, 14 Drawing Sheets

(56) References Cited

U.S. PATENT DOCUMENTS

| | | | |
|---|---|---|---|
| 5,074,115 A * | 12/1991 | Kawamura | 60/608 |
| 5,121,605 A * | 6/1992 | Oda et al. | 60/608 |
| 5,605,045 A * | 2/1997 | Halimi et al. | 60/607 |
| 5,787,711 A * | 8/1998 | Woollenweber et al. | 60/597 |
| 5,904,471 A * | 5/1999 | Woollenweber et al. | 417/371 |
| 5,957,667 A * | 9/1999 | Epp | 417/271 |
| 6,045,344 A * | 4/2000 | Tsuboi et al. | 418/100 |
| 6,129,524 A * | 10/2000 | Woollenweber et al. | 417/366 |
| 6,139,275 A * | 10/2000 | Noda et al. | 416/203 |
| 6,145,314 A * | 11/2000 | Woollenweber et al. | 60/607 |
| 6,183,215 B1 * | 2/2001 | Sakai et al. | 417/371 |
| 6,305,169 B1 * | 10/2001 | Mallof | 60/608 |
| 6,449,950 B1 * | 9/2002 | Allen et al. | 60/607 |
| 6,591,612 B2 * | 7/2003 | Bolz et al. | 60/608 |
| 6,700,235 B1 * | 3/2004 | McAfee | 310/52 |
| 6,739,845 B2 * | 5/2004 | Woollenweber | 417/407 |
| 6,841,910 B2 * | 1/2005 | Gery | 310/103 |
| 6,927,509 B2 * | 8/2005 | Cichetti, Sr. | 310/52 |
| 7,025,577 B2 * | 4/2006 | Ioi et al. | 417/371 |
| 7,025,579 B2 * | 4/2006 | Woollenweber et al. | 417/407 |
| 7,042,121 B2 * | 5/2006 | De Filippis et al. | 310/63 |
| 7,162,861 B2 * | 1/2007 | Khair | 60/280 |
| 7,342,332 B2 * | 3/2008 | McAuliffe et al. | 310/58 |
| 7,360,361 B2 * | 4/2008 | Prusinski et al. | 60/608 |
| 2005/0100451 A1 * | 5/2005 | Manda et al. | 417/356 |
| 2005/0189772 A1 * | 9/2005 | Gozdawa | 290/52 |
| 2007/0122296 A1 * | 5/2007 | Arnold et al. | 417/407 |
| 2009/0010771 A1 * | 1/2009 | Vinson et al. | 417/366 |

\* cited by examiner

[View A]

[View B]

Cross section Z-Z

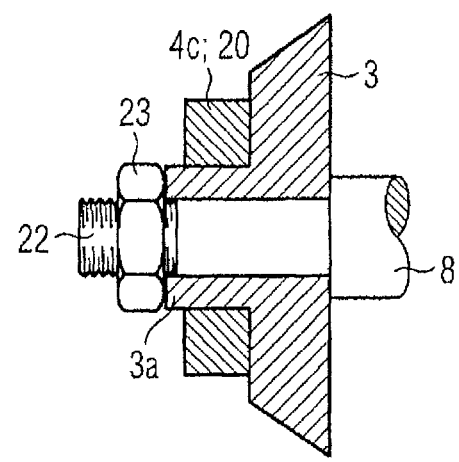

exploded view

FASTENING OF ROTOR MAGNETS ON THE SHAFT OF A COMPRESSOR ARRANGEMENT

This Application is a National Phase application of PCT Application Ser. No. PCT/EP2008/003197 filed on Apr. 15, 2008 which claims priority to: (1) PCT Appln. Ser. No. PCT/EP2007/009446 filed on Oct. 25, 2007; (2) PCT Appln. Ser. No. PCT/EP2007/009445 filed on Oct. 25, 2007; (3) EP Patent Appln. Ser. No. 07 090 100.4 filed on May 24, 2007; (4) EP Patent Appln. Ser. No. 07 075 981.6 filed on May 24, 2007; (5) EP Patent Appln. Ser. No. 07 075 496.5 filed on Jun. 20, 2007; (6) EP Patent Appln. Ser. No. 07 075 661.4 filed on Aug. 1, 2007; (7) U.S. patent application Ser. No. 11/781,644 filed on Jul. 23, 2007; (8) U.S. patent application Ser. No. 11/781,684 filed on Jul. 23, 2007; (9) U.S. patent application Ser. No. 11/915,350 filed on Nov. 23, 2007; and (10) U.S. patent application Ser. No. 11/915,353 filed on Nov. 23, 2007.

FIELD OF INVENTION

The invention relates to a compressor arrangement, in particular to a turbocharger.

BACKGROUND INFORMATION

Internal combustion machines with turbochargers are basically known. Typically, an exhaust gas flow from an internal combustion machine is utilised to drive a turbine wheel. This turbine wheel is for example coupled via a shaft to a compressor wheel, which ensures a compression of supplied fresh air in the combustion space. Such a precompression or "charging" leads to an increased motor power or to an increased torque, compared to conventional internal combustion machines. However, with such types of charged internal combustion machines, there exists the problem of the so-called "turbo-hole" which in particular occurs when starting up and accelerating from low rotation speeds of a vehicle, thus when the internal combustion engine is to be rapidly increased in the region of higher power. This is due to the fact that the increased air quantity requirement on the air intake side may only be provided with a delay (amongst other things caused by the inertia of the system of the turbine wheel and compressor wheel).

SUMMARY OF INVENTION

The present invention relates to a turbocharger which, with as little delay as possible, feeds exactly the correct quantity of fresh air and furthermore is simple in construction and is prone to failure as little as possible.

Moreover, the arrangement should also be able to be manufactured in an inexpensive manner, also in a large industrial scale and also be easy to repair.

The invention relates to compressor arrangements with which a gap between the rotor and stator, and which is larger compared to the state of the art, is given, wherein preferably air to be compressed is led through this gap to a compressor arrangement. This may be a compressor arrangement for comprising fresh air for combustion engines, containing a compressor wheel as well as an electric motor with at least one rotor containing a rotor magnet, and with at least one stator as well as at least one rotor gap between the rotor and stator, wherein the rotor gap is designed such that with a rotating compressor wheel, at least 50%, preferably at least 90%, particularly preferably at least 100% of the air mass flow to be compressed is led through the rotor gap. Thus what is important is that the main air mass flow is led through the rotor gap and other air flows (such as recirculation flows or cooling flows) are kept relatively small in relation to this (see patent claim 1). Moreover, one should relate to the independent patent claims according to patent claims 18 and 19. In the context of this application, the term "rotor gap" is to be used in equal importance to "media gap" and "air gap".

The present invention also relates to a compressor arrangement for compressing fresh air for internal combustion engines, containing a compressor wheel as well as an electric motor, with a rotor and stator, wherein the rotor comprises at least one rotor magnet and the smallest inner diameter of the stator is 1.2 to 10 times, preferably 1.5 to 8 times, particularly preferably 2 to 4 times, very particularly preferably 2.3 to 4 times as large as the largest outer diameter of the rotor. The rotational speed of the electric motor for compressing air is usually more than 15'000 rpm.

The present invention also relates to a compressor arrangement which comprises an electric motor with a stator, with a rotor with a rotor magnet, as well as a media passage opening between the rotor and stator, and in at least one cross section of the electric motor, the ratio of the cross sectional area of the inlet opening to the cross sectional area of the rotor magnet lies between 0.5 and 100, preferably between 0.8 and 50, particularly preferably between 2 and 20. Terms "cross sectional area of the inlet opening" or "cross sectional area of the rotor magnet" are defined once again in a precise manner in the introduction description.

Common to all three mentioned variants is the feature that a relatively large gap is given between the stator and the rotor, through which for example air to be compressed may be led as a used medium.

Hereby, characteristic of these three variants is that in each case, the compressor wheel is fastened on a shaft, or the compressor wheel contains this shaft, and at least one rotor magnet or a carrier for holding the rotor magnet, as a separate component, may be assembled onto this shaft and may be screwed to it, pressed on to it, tottered to it, bonded to it, soldered to it, welded to it, peripherally injected to it, shrinkable onto this shaft, shrinkable into the shaft or be securable on this shaft against rotation by way of a positive fit. This means that the rotor magnet may be connectable to the shaft with the help of releasable and non-releasable connection elements.

This fastening is alternatively to be seen in that the rotor magnet of the rotor is partially or also completely integrated into the compressor wheel. With these variants, it is thus mainly the case here of attaching the rotor magnet or its carrier as a separate element, which may be advantageous with regard to manufacturing technology under certain circumstances.

The compressor wheel is usually fastened on a shaft, for example by way of shrinking on and additional screwing, or at least shrinking on and additional axial fixation. What is important is that no unnecessary weakening is introduced into the compressor wheel on account of the notch effect of threads or additional recesses, in particular with aluminum die casting. Such a weakening should however in no way be ruled out here, but what is important (and this applies to the rotor magnet or its carrier) is to find arrangements which are as rotationally symmetrical as possible, so that too large a loading of the shaft and its bearing due to non-roundness, may be ruled out.

The compressor wheel may however also itself comprise a continuation, which represents a shaft and for example is arranged around another shaft (on which for example a turbine wheel is also fastened), or in the extension of such a shaft. A rotor magnet may be applied onto a shaft (be it the shaft, on which the compressor wheel itself is seated or a corresponding shaft of the compressor wheel). Here for example, hollow-cylindrical shapes are suitable, onto which the rotor magnet may be attached radially with a positive fit, so that a rotation may be prevented already by way of the positive fit. However, it should be noted that common magnet materials may become instable at high rotation speeds already on account of their brittleness, or may be quite instable due to additional mechanical loading. For this reason a separate carrier, preferably of metal or plastic is suitable, which holds the rotor magnet. Now according to the invention, it is possible to assemble the rotor magnet or the carrier for holding the rotor magnet as a separate component onto one of the mentioned shafts and to screw it, cotter it and bond it on this shaft, shrink it onto this shaft or secure it on this shaft against rotation by way of positive fit.

This may be effected radially on the outside as well as radially on the inside or also in the extension of the shaft axis.

With the possibilities mentioned above, a compressor arrangement according to the invention which has a large rotor gap, may be easily manufactured in a large-scale industrial manner, and in particular the maintenance and repair is once again simplified.

Further formations of the invention or details or closer definitions are once again explained hereinafter.

One further formation envisages the shaft, on which the compressor wheel is fastened further carrying a turbine wheel. This is the most common arrangement with classic turbochargers, usually the mounting of the shaft is arranged between the compressor wheel and the turbine wheel.

One further formation envisages the shaft comprising a thread for screwing the compressor wheel, the rotor magnet and/or the carrier of the rotor magnet. Apart from a radial fixation, an axial fixation is also achieved by way of this, and additional securement in the form of securing rings or likewise may be provided.

A further formation envisages the shaft comprising a thread for attaching a threaded nut for jamming and/or securing the compressor wheel, of the rotor magnet. With the threaded nut, on the one hand a firm axial retention exists and moreover the arrangement, for example after a strong thermal loading, may be readjusted. Also spacers or spacer disks may be arranged between the individual components which are arranged axially on the shaft behind one another.

For additional radial securement, the positive fit of the compressor wheel, of the rotor magnet and/or of the carrier of the rotor magnet on the one hand, and of the shaft on the other hand, may be effected by way of an inner toothing which is complementary to the outer toothing of the shaft, or also by way of an outer toothing which is complementary to a corresponding inner toothing of the shaft. Alternatively, the positive fit of the compressor wheel, of the rotor magnet and/or of the carrier of the rotor magnet on the one hand and of the shaft on the other hand may be created by way of a tongue and groove connection. The compressor wheel on the one hand and the rotor magnet or the carrier of the rotor magnet on the other hand may furthermore be screwed radially to one another, for example by way of a carrier of the rotor magnet being screwed onto the compressor wheel or being screwed into a shaft of the compressor wheel, which projects as a continuation. Additionally, an axial fixation is also possible, for example by way of screwing the carrier of the rotor magnet or also the rotor magnet itself onto the compressor wheel by way of screws which run parallel to a shaft.

Alternatively, a radial or axial securement of the rotor magnet or the carrier of the rotor magnet may be effected by way of cotter pins, and for this, the shaft comprises weakenings which are preferably arranged in a rotationally symmetrical manner, into which further components are inserted or screwed for securing.

The carrier of the rotor magnet, just as the compressor wheel, may be of plastic or metal. Both materials have the advantage that these may be easily manufactured in a large-scale industrial manner with the injection moulding method. Plastic in particular is well suitable for the carrier of the rotor magnet, since the carrier preferably does not project radially so far as the compressor wheel and for this reason modern plastics may be sufficient even with very high rotating speeds, in order to withstand the loading of the rotor magnets held in the carrier.

The carrier may comprise annular chambers or part-annular chambers into which a hollow-cylindrical or annular magnet may be applied, or rings sections of this. One advantageous variant envisages several cavities for inserting rotor magnets being provided, wherein these cavities are preferably arranged radially around the shaft in a regular manner, in order to permit a round running of the shaft.

Hereby, the carrier may comprise axially open chambers for receiving the rotor magnets (these may be open on one side or both sides), however chambers which are closed by covers may also be provided.

The shaft itself may be stepped, in order to fix a rotor magnet or the carrier of the rotor magnet or the compressor wheel axially at least on one side.

A further advantageous formation envisages the carrier further comprising wings or screws, which for example carries out a precompression of the gas flow, which is to be compressed by the compressor wheel. These wings or screws may preferably be fastened radially outside on the carrier.

The invention also relates to a turbocharger with a compressor arrangement for compressing fresh air for internal combustion engines, containing a compressor wheel as well as an electric motor with a rotor and stator, wherein a rotor magnet of the rotor is designed such that it is partially or also completely integrated into the compressor wheel (thus that the rotor magnet or the rotor on the one hand and the compressor wheel on the other hand are connected to one another) and the smallest inner diameter of the stator is 1.5 to 8 times as large as the largest outer diameter of the rotor. The specified lengths relate hereby in each case to the largest extensions or the smallest extensions of the participating elements, however only in the region of the electrically or magnetically effective elements, i.e. for example only over the length of the rotor magnet).

In the context of the present application, "turbochargers" are to be understood as all means, which may supply precompressed combustion air to an internal combustion machine, by which means a larger air mass gets into the combustion space. (A classic compressor wheel turbine wheel coupling is thus not necessary).

The invention furthermore relates to a turbocharger containing at least one compressor wheel, wherein the compressor wheel may be driven via at least one electric motor, and the electric motor comprises a rotor, a stator, as well as a rotor gap between the rotor and stator, and the rotor gap is designed such that with a rotating compressor wheel, at least 50%, preferably at least 90% of the air mass flow to be compressed is led through the rotor gap.

The mentioned percentage numbers in each case specify minimum ranges. The percentage numbers hereby basically apply to the complete rotational speed range of the turbocharger or of an internal combustion engine connected thereto.

In a further formation, the complete air flow which is led to the respective compressor wheel, is to be led through this rotor gap.

The limitation with regard to numerical values amongst other things also has the purpose of accordingly ruling out undesired or "coincidental" leakage flows as may occur in the state of the art. A "recirculation flow" between the rotor and the stator with subject-matters according to the state of the art, with which the rotor is attached on the outer side of the compressor wheel very close to the stator, should however not be seen as a "air mass flow to be compressed" since such a "recirculation air" strictly speaking has already passed the compressor heel.

Advantageous is an "integral" construction form, with which a large part of the air mass flow to be compressed or even the complete air mass flow to be compressed, is led through the rotor gap to the at least one compressor wheel.

In contrast to the attachment of rotors on the radial outer sides of the compressor wheel, it is advantageous to arrange the rotor or its magnetically effective parts as close as possible to the rotation axis of the compressor wheel. This on the one hand is very favourable from a mechanical point of view with quickly running turbochargers, since here mechanical damage may occur under certain circumstances due to the very high or very rapidly changing centrifugal forces. It is also advantageous that in this manner, the moments of inertia may be kept relatively small, since magnets lying radially outside usually have a high specific weight and thus a very high moment of inertia. By way of this, the instationary behaviour of the compressor may be considerably improved. Added to this is the fact that with magnets lying on the outside on the compressor wheel, these are also thermally loaded to a greater extent, since a greater warming may arise on these outer sides by way of the compression work, which may have a disadvantageous effect on the life duration of the magnets of the rotor.

Turbochargers are known from various literature, which are used for the production of electricity. These turbochargers may be designed as small gas turbines and likewise have a turbine as well as a rigidly coupled compressor. A conventional generator for the production of electricity is flanged on the runner shaft of the turbine. Since the generator is arranged within the intake tract, it represents a high flow resistance, which reduces the efficiency, and simultaneously very high loads on the bearing components occur at the same time.

A further formation of the inventive turbocharger envisages using this e.g. as a micro turbine for the combined heat and power coupling or the combined cooling and power coupling. Thereby, the combustion air flows between the rotor and stator of the electric motor/generator, into the compressor and there is compressed and thus preheated to approx 200° C. In a heat exchanger, the preheated compressed air is brought to a higher temperature level by way of the hot exhaust gas. The compressed, warm air is combusted with a fuel, e.g. regenerative gas in a combustion chamber arranged downstream. The hot gasses which thus arise are expanded in the turbine and drive the turbine wheel and thus the compressor as well as the generator. The thermal energy of the exhaust gas in the heat exchanger is partly released again directly to the compressed combustion air. Moreover, this turbocharger according to the invention may be coupled to a second heat exchanger, in order to utilise the common residual heat for producing hot water or it may feed a heating circuit, e.g. for temperature control of a building. The generator may be used as an electric motor for starting the process. Thus for example with the turbocharger according to the invention, one may produce inexpensive small combined heat and power plants, whose essential components consist of large-scale manufactured components.

One further formation envisages the mass of the rotor magnet being between 5 g and 1000 g, preferably between 10 and 100 g for automobile turbochargers. The mass moment of inertia of the magnetically (actively) effective mass of the electric motor with respect to the rotation axis of the rotor hereby is between 0.1 kgmm$^2$ and 10 kgmm$^2$ preferably between 0.3 kgmm$^2$ and 1.0 kgmm$^2$ for automobile applications.

By way of the fact that relatively large air gaps are possible with the rotor gap according to the invention, thus the masses as well as the mass moments of inertias of the electrically or magnetically effective motor components are small, despite this, a very homogeneous field arises.

One further formation envisages the compressor wheel being mounted on an shaft and containing blades, wherein the front edges of the blades (thus the section of the compressor wheel onto which the air hits first of all) in the air inlet flow direction lie upstream with respect to a magnetically effective front section of the rotor and/or a magnetically effective front section of the stator.

This therefore means that the active components of the electric motor (rotor or stator) are arranged axially even greater towards the air inlet, and the actual compressor wheel is arranged downstream. By way of this, amongst other things, it is possible to lead the complete inlet air to be fed to the compressor wheel, through the rotor gap.

However with regard to design it is possible to apply the rotor into the compressor wheel or even on the side of the compressor wheel, which faces the turbine wheel, in order to reduce the bending moment on the compressor shaft, and despite this, the air mass flow to be compressed is primarily led through the rotor gap.

A mixed construction of several different rotor magnets at different locations of the compressor wheel (in front of within and/or behind) permits an optimisation of the necessary construction space with a simultaneous optimisation of the motor torque and reduction of the bending loading of the rotor shaft. Thereby, the shape of the rotor/stator does not necessarily need to be circularly cylindrical, but may be adapted to the shape of the compressor wheel.

The invention furthermore envisages a method for the operation of the turbocharger according to the invention. The turbocharger as mentioned above, comprises at least one compressor wheel for compressing air, and the compressor wheel may be driven with an electric motor, wherein a rotor gap is arranged between the rotor and stator of the electric motor, and at least 50%, particularly preferably at least 90% of the air mass flow led to the compressor wheel in at least one operating condition of the turbocharger is led through the rotor gap.

This "operating method" is already discussed in the device claims, and there, that which has been said there also accordingly applies to the operating method claimed here. What is important is that the proportionate air mass flows mentioned above of at least 50% and at least 90% even 100% may be achieved in normal operation of the turbocharger, for example in an operating condition with which the rotational speed of the compressor wheel is between 5000 and 300000 rpm, preferably between 40000 and 200000 rpm or also the rotational speed of a connected combustion engine is between 50 and 200000 rpm, preferably between 100 and 15000 rpm with reciprocating engines.

It should be noted once again that a "turbocharger", in the context of the present invention does not necessarily need to contain a turbine wheel driven by an exhaust gas flow. It is merely important that at least one (however driven) compressor wheel is contained in the "turbocharger" for supplying precompressed combustion air to a combustion engine.

The turbocharger according to the invention, in a further formation, comprises a turbine wheel as well as a compressor wheel connected thereto, wherein an electric motor is provided on the side of the compressor wheel, which is distant to the turbine wheel, and a rotor of the electric motor, which is connected to the compressor wheel in a rotationally fixed manner, is designed in a freely projecting manner.

The electric motor, given a higher fresh air demand (e.g. ascertained by control electronics) serves to provide for an additional acceleration of the compressor wheel by the electric motor. Electric motors are favourable for this, since these may be accelerated with a high torque without any noticeable starting delay.

Moreover, it is advantageous, that the electric motor in the present case is not arranged between the turbine wheel and the compressor wheel. Such an arrangement may lead the thermal problems and also represents a great design modification of conventional (purely mechanical) turbochargers. Apart from the increased design expense, the repair expense is significant with such constructions.

Advantageous (but also not necessary within the framework of the invention) is the fact that in the present case, a sequence "turbine wheel, shaft (mounting), compressor wheel, electric motor" is given seen in the axial direction. The electric motor is then essentially only subjected to the temperature of the surroundings, so that here a thermal decomposition of the stator winding etc. may not occur.

One advantage lies in the freely projecting end on the other side of the compressor wheel. The rotor of the electric motor is attached here. It is possible, but not absolutely necessary, to apply a further bearing location here, in order thus to mount the rotor on both sides. Such a bearing location may one the one hand upset the electrical characteristics of the electric motor under certain circumstances, and on the other hand under certain circumstances represents a static redundancy. Moreover the friction work in the system is increased. Furthermore, under certain circumstances, the fresh air supply is hindered by way of such a bearing, since suitable struts reduce the inlet air opening towards the compressor wheel. Such a bearing location, i.e. an axial mounting of the compressor wheel on both sides, is however also easily possible.

Moreover with the "projecting" motor, the design difference to purely mechanical turbochargers is conceivable low, so that in this manner an electric motor may be supplemented to conventional turbochargers in a very inexpensive, modular and easily repairable manner.

The drive system according to the invention, apart from the turbocharger according to the invention, comprises an internal combustion engine. "Internal combustion engine" in the context of the present invention is to be understood as any motor, which requires or produces fresh air/fresh gas as well as exhaust gas, so that a corresponding turbocharger may be applied here. Moreover, the drive system also comprises a storage device for electrical energy. Here preferably, the electric motor of the turbocharger is connected to the storage device for electrical energy for the removal of electrical energy in a motor operation of the turbocharger, and for feeding energy in a generator operation of the turbocharger.

In many operating conditions of a turbocharger (e.g. full load, thrust operation, etc) up to 30% of the exhaust gas is blown out unused. With the described embodiment of the turbocharger, the energy of this excess exhaust gas may additionally be used in an energetic manner by way of the electric motor being used as a generator. In this manner, on the one hand excess "thermal/kinetic energy" may be recovered again as electrical energy, and the energy balance of the drive system is considerably improved by way of this. Ideally, the turbocharger may even be designed such that the combustion engine located in the motor vehicle no longer requires an additional dynamo.

It is particularly advantageous with this drive system if the electric motor of the turbocharger or of the electrical storage device connected to it may be additionally connectable to an electromotoric drive of a motor vehicle. This electromotoric drive may for example be a hub electric motor (or another electric motor provided in the drive train), which is fastened on a drive wheel of the motor vehicle. In modern, so-called "hybrid vehicles" an additional provision of torque or motor power on acceleration is achieved in this manner, since apart from the internal combustion engine, the electrical hub motors are also responsible for the acceleration. With braking procedures, by way of switching the electrical hub motors into generator operation, a braking effect and thus a recovery of kinetic into electrical energy is achieved, which is intermediately stored in a suitable storage device. If now the electric motor of the turbocharger is also connected to this storage device, then thus the complete electrical energy may be "managed" centrally, in order to render this able to be called up at any time in a useful manner.

Apart from this, it is of course also possible for the turbocharger system and the electrical hub motors (or other motors in the drive train) to have storage devices which are independent of one another.

This may be advantageous if the turbocharger system (or compressor system thus without a turbine wheel) has an electrical voltage which differs from that of the on-board system of the motor vehicle or of an electrical drive system of the vehicle. It is possible by way of this, for this independent system for example to be automatically charged for example in the thrust operation of the motor vehicle, and to be supplied with drive energy again from a corresponding independent storage device, when accelerating. An upward transformation or downward transformation between the electrical system of the compressor system and the drive system or the on-board mains is therefore no longer necessary, and the system may be suitably electrically encapsulated for additional safety.

The turbocharger according to the invention is moreover suitable for the application in modulatable electricity production installations, which may be operated with fuels such as natural gas, liquid gas, heating oil, but also regenerative gases such as biogas, sewage gas and landfill site gas or solid fuels such as chopped wood, wood parts, straw, etc. Inexpensive installations for energy production with a high efficiency may be realised by way of this type of combined heat and power coupling. The turbocharger according to the invention may thus also be used as a base module of a microturbine for the combined heat and power coupling.

Control electronics are preferably to be provided in the drive system for controlling the electrical energy, the charging and discharging procedure or for providing an optimal torque with a low consumption. The rotational speed of the turbine wheel or compressor wheel, actual values of the pressure conditions on the turbine housing side and compressor housing side, as well as further characteristic variables which are relevant to the internal combustion engine with regard to torque, serve as control parameters.

A further formation envisages the turbine wheel and the compressor wheel being permanently connected to one another in a rotationally fixed manner. This means that no coupling is given between the turbine wheel and the compressor wheel, by way of which the mechanical construction and the proneness of the system to failure would be increased. Instead of this, one seeks to limit the moved rotation masses by way of a lightweight rotor, a lightweight compressor wheel, a lightweight shaft and a suitably low-mass turbine wheel.

The housing of the turbocharger is preferably constructed in a modular manner i.e. that apart from a turbine housing for the turbine wheel, a compressor housing for the compressor wheel is given. The turbine housing is preferably connected to an exhaust manifold, which leads exhaust gas from the individual cylinders of the internal combustion engine to the turbine heel. On account of the thermal loading of the turbine housing, the design demands are somewhat different than on the compressor housing, which surrounds the compressor wheel. The actual mounting of the turbine wheel and compressor wheel is preferably effected exclusively between the turbine wheel and the compressor wheel. I.e. no additional mounting is given on the side of the compressor wheel, which is distant to the turbine wheel, since here indeed the rotor of the electric motor projects in a free manner. Preferably, a bearing housing is provided between the turbine housing and the compressor housing, which serves for receiving bearing elements for the turbine wheel and the compressor wheel.

Preferably, the electric motor contains a stator, which has an essentially cylindrical shape and which surrounds the rotor in a concentric manner. Hereby, it is advantageous that the stator may be designed as part of the inner wall of the compressor housing. The stator for example, as an insert, may be applied into a corresponding opening of the compressor housing. The advantage of these embodiments is the fact that only an as small as possible design change of conventional mechanical turbochargers is necessary, so that by way of this, large cost advantages and competitive advantages may be realised in large-scale manufacture.

The rotor of the electric motor preferably comprises a rotor magnet which is surrounded by a reinforcement. The rotor magnet is mechanically protected by way of this. Moreover, one may influence the type of magnetic field by way of this. The rotor magnet may be designed such that it is integrated partially or also completely into the compressor wheel. If the compressor wheel consists of fibre-reinforced or unreinforced plastic, then the rotor magnet on production may be peripherally injected directly with the plastic mass, by which means an inexpensive large series manufacture is made possible.

Preferably, the reinforcement of the rotor is designed in a "hollow-cylindrical" manner.

It is advantageous with regard to manufacturing technology that the rotor magnet on the inside is hollow in regions, for application onto a common shaft with the compressor wheel. An inexpensive manufacture is possible in this manner.

The compressor wheel preferably consists of a non-magnetisable material which does not negatively influence the electromagnetic field. Preferably, the compressor wheel may be of a non-metallic material, preferably of a reinforced or non-reinforced plastic.

A further formation envisages the rotor gap between the rotor and the stator representing an (and specifically the only intended) inlet opening for the compressor wheel. This in turn means that the electric motor hardly inhibits the air feed flow and that no additional air feed openings need to be provided, which would unnecessarily increase the flow resistance. For this reason, it is even possible for the inlet air opening to be free of struts between the rotor and stator. Here, such struts are not necessary due to the absence of the "counter-bearing".

Such a "counter-bearing" may be applied to the same extent with "classical" turbochargers with turbines, as well as with turbochargers which are merely designed as a compressor stage (for example with particularly high rotational speeds, critical natural frequencies etc.).

The inlet opening, depending on the dimensioning of the rotor and stator, may be provided with a large cross sectional area. Preferably, the smallest inner diameter of the stator is 1.2 to 10 times, preferably 1.5 to 8 times, particularly preferably 2 to 4 times as large as the largest outer diameter of the rotor. The specified lengths relate thereby in each case to the largest extensions or smallest extensions of the participating elements, however only in the region of the electrically or magnetically effective elements (thus only over the length of the rotor magnet for example, a subsequent thickening for example in the region of the compressor wheel is not important here). It is sufficient if the values are fulfilled in a single cross section (of a cross sectional area).

A further formation envisages the compressor wheel containing a conveyor structure in the form of worms, blades or wings, wherein the front edges of the conveyor structure in the air inlet flow direction lie downstream or upstream with respect to a magnetically effective front edge of the rotor magnet or of a magnetically effective conveyor edge of the stator. "Magnetically effective front edges" in this context are meant as the actual electrical or magnetic components, however without insulating casings etc. Freedoms are given with this to arrange the stator or the rotor in a practically infinite manner with regard to the compressor wheel, depending on the case of application. For example, the arrangement of the front edge of the rotor magnet upstream to the air inlet flow direction is useful if for example a compressor wheel of a metallic material is used. The electrical or magnetic characteristics of the respective motor are particularly favorable by way of the fact that the rotor magnet projects out of the compressor wheel. If however a minimisation of construction space is demanded, the rotor magnet may begin not until within a conveyor structure of the compressor wheel. This lends itself for example if the conveyor structure consists of a plastic material. The front edge of the stator may likewise be arranged upstream or downstream with respect to a front edge of the conveyor structure. Here, likewise construction space considerations as well as material considerations are at the forefront.

A further (alternatively or cumulatively to that which has been previously said) construction form envisages the compressor wheel containing a conveyer structure in the form of blades, worms or wings, wherein the rear edges of the conveyor structure in the air inflow direction lie downstream or upstream with respect to a rear edge of the rotor magnet and/or a rear edge of the stator. Depending on the dielectric or magnetic characteristics of the surrounding materials, the dimensions of the rotor magnet or of the stator or of the compressor wheel/the conveyor structure, thus the "driving" elements may also partly be arranged downstream of the conveyor structure. Hereby, particularly large or high-power stator arrangements or rotor magnets may also be designed so long that they axially project beyond the conveyor structure or the compressor wheel on both sides (thus downstream and upstream).

A further advantageous further invention envisages the stator and/or rotor being inclined with respect to an axis of the compressor wheel.

This thus means that the outer contour or the inner contour of the rotor magnet or stator do not need to be cylindrical or hollow-cylindrical, but that here there may be other shapes, for example truncated cone shapes or hollow truncated cone shapes. The diameter or area ratios according to the invention with these inclined structures must only be realised in a single step in order to realise the patent teaching according to the invention.

A further advantageous further formation envisages the rotor magnet being arranged radially outside the hub of the compressor wheel with respect to the axis of the compressor wheel. This arrangement, although not always being desirable on account of higher mechanical and also thermal loading of the rotor magnet, however gives an even greater flexibility, for example the possibility of a small hub (or in the ideal case the absence of the hub) and an additional airflow in the centre of the compressor wheel. For this, the compressor wheel may also be designed such that air may be led radially within as well as radially outside the rotor magnet. Here for example, one may imagine designing the rotor magnet in an essential annulus-shaped manner, but however this may also be realised by an arrangement of several rotor magnet segments.

Hereby, the compressor wheel may be designed such that at least 50%, preferably at least 70%, particularly preferably at least 90% is led radially outside the rotor magnet.

One variant already mentioned above, envisages that in at least one cross section, the ratio of the cross sectional area of the inlet opening to the cross sectional area of the rotor magnet (expressed by formula: $V_{QE}=A_{inlet\ opening}/A_{rotor\ magnet}$) being between 0.5 and 100, preferably between 0.8 and 50, particularly preferably between 2 and 20.

The primary working performance of the media gap motor is conveying media through the gap between the rotor and the stator, or as a generator, the drive by the delivery medium in the media gap.

"Cross sectional area of the inlet opening" is meant as the actual open cross section in which air or a fluid may be led. This is thus the actual "net cross sectional area of the inlet opening" in this region. For example, with a circular inlet opening, firstly the complete circular area is to be assumed, but for determining the net cross sectional area however the respective cross sectional area of the blades or of the hub (including reinforcement, rotor magnet etc.) is to be considered. The measure found here is thus a ratio of the actual rotor magnet (with regard to area) to the actual cross section through which air may flow.

The cross section for determining $V_{QE}$ preferably runs through a region in which not only the rotor magnet is present, but also a magnetically or electrically effective section of the stator.

A further formation envisages the ratio of the cross sectional area of the stator to the cross sectional area of the rotor magnet (expressed by formula $V_{QS}=A_{stator}/A_{rotor\ magnet}$) being between 2 and 100, preferably between 10 and 50. Here, in each case "net cross sectional areas" of the electrically effective components of the stator and of the rotor magnet are to be specified. Insulating components or components which are not electrically/magnetically effective components are not included in the calculation. Thus with the stator, a metallic base body (including for example copper windings) is included in the cross section in the calculations, but not a surrounding insulating plastic. Accordingly, with the rotor magnet, also only the actual magnetically effective areas are included in the calculation, even if the rotor consists of different parts (then the individual areas are to be added accordingly so that a total area of the rotor manner may be determined).

The cross sections mentioned above preferably lie perpendicular to the axis of the compressor wheel.

A further formation envisages the rotor being connected to the compressor wheel and the compressor wheel being mounted axially on both sides. Hereby, the compressor wheel may be connected to the turbine wheel or not, what is merely important is that the compressor wheel is axially mounted on both sides, thus does not project.

A further advantageous further formation of the invention envisages the turbocharger merely being designed as a compressor system with at least one compressor wheel, and the at least one compressor wheel being mounted axially on one or both sides. In this case the compressor wheel would also not be connected to the turbine wheel.

A further formation envisages the turbocharger comprising a turbine wheel and the compressor wheel, wherein the electric motor is arranged on the side of the compressor wheel, which faces the turbine wheel, or between the side of the compressor wheel, which faces the turbine wheel and the side which is distant to the turbine wheel.

A further formation envisages the smallest inner diameter of the stator being 1.1 to 1.49 times, preferably 1.25 to 1.49 times as large as the largest outer diameter of the rotor.

A further advantageous further formation envisages the smallest inner diameter of the stator being 8.01 to 15 times, preferably 8.01 to 12 times as large as the largest outer diameter of the rotor.

The specified lengths relate here in each case to the largest extensions or smallest extensions of the participating elements, but only in the region of the electrically or magnetically effective elements (thus only for example of the rotor magnet, and a subsequent thickening for example in the region of the compressor wheel is not of any importance here).

For reducing the current strength and for increasing the energetic efficiency, hereby the nominal voltage of the electric motor may be more than 12 V, for example 24 or 48 V.

It is possible that the electric motor may be switched from motor operation into generator operation. If the charging pressure (in the turbine housing) reaches a certain nominal value, additional energy is produced with the use of a converter capable of regenerative braking. Moreover, ideally by way of the energetic conversion of the braking energy, one may make do without a waste gate/pressure capsule for blowing out an excess exhaust gas pressure.

The control of the motor/generator operation for the first time permits the immediate, targeted closed-loop control of the charging procedure. Since the electric motor is preferably controlled with a closed loop via a frequency converter, the rotational speed of the compressor as well as of the turbine wheel and thus of the air mass flow may be determined in an exact manner. The control of the charging procedure of the combustion engine is preferably integrated into the central motor control. With this, it is possible to realise a charging controlled by the characteristic field. Thus an exact matching and optimisation of the combustion parameters (fuel quantity, air quantity, charging pressure, exhaust gas return rate, ignition point in time, etc) is possible, by which means a significant reduction in fuel consumption is achieved. This thus represents an active characteristic field extension, by which means the energy balance of the combustion engine may be considerably improved. This closed-loop control circuit permits the control and optimisation of the complete combustion procedure within the combustion space of an internal combustion engine.

BRIEF DESCRIPTION OF DRAWINGS

The present invention is now explained by way of several figures. There are shown in FIG. 1a a first embodiment of a turbocharger according to the invention, in part section;

FIG. 1d a part exploded drawing of the turbocharger of FIG. 1a;

FIG. 1m the design of a shaft as a continuation on a compressor wheel;

FIG. 2b a part exploded view of the turbocharger according to FIG. 2a;

DETAILED DESCRIPTION

The basics of the invention are to be shown hereinafter by way of the first embodiment form according to FIGS. 1a to 1d.

Figure 1A:
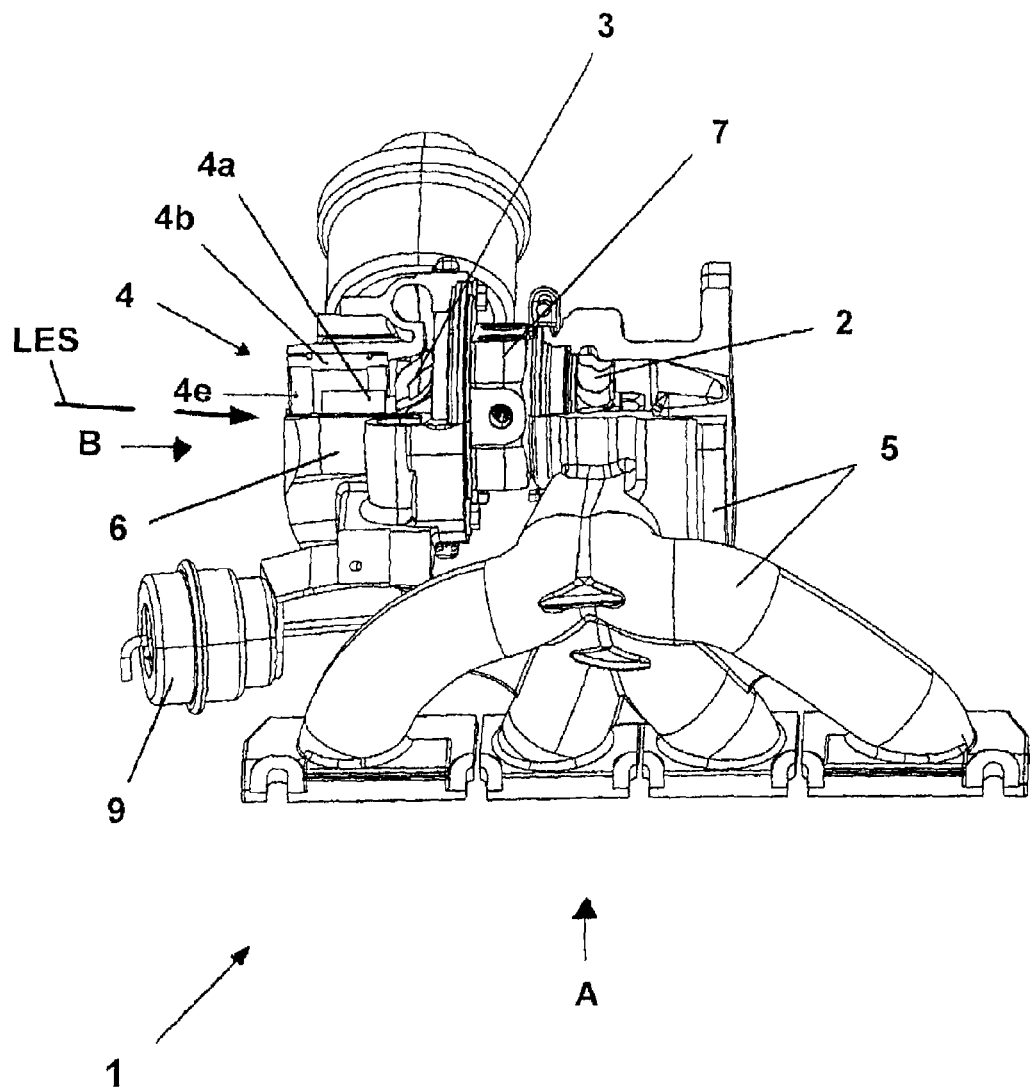

FIGS. 1a to 1d show an electrically modified mechanical turbocharger 1, which may be coupled with a turbine housing 5, onto an internal combustion engine. After combustion, the exhaust gas is collected by the exhaust manifold shown in FIG. 1a and is used for driving the turbine wheel 2. The turbine wheel 2 is surrounded by the turbine housing 5 and is essentially taken from a conventional mechanical turbocharger. A bearing housing 7 connects to the turbine housing 5, and then a compressor housing 6. A compressor wheel is attached in this compressor housing 6, and the air fed through an inlet opening (this inlet opening is to be seen particularly well in FIG. 1c) is compressed by way of a compressor wheel 3 and is led in a manner which is not represented here, to the combustion space of the internal combustion engine. The compressor wheel 3 in FIG. 1a on the left side shows a continuation, on which a rotor 4a of an electric motor is given. The rotor 4a is attached centrally in the inlet opening 4e. The air inlet flow direction is indicated in FIG. 1a at LES (here coaxially to the axis of the compressor wheel).

A stator 4b is provided around the rotor 4a and has essentially a hollow-cylindrical shape and is represented as part of the inner wall of the compressor housing in the region of the inlet air opening. Here, the stator 4b is even provided as an insert into the respective opening, so that this may be assembled in a very simple manner. Here therefore, the rotor gap between the rotor 4a and the stator 4b in FIG. 1a is the inlet air opening 4e for the compressor wheel. Hereby according to FIG. 1a, the inlet opening 4e is free of struts between the rotor and the stator. In the shown section, the smallest inner diameter of the stator (see "$d_s$" in FIG. 1d) is for example 1.5 times larger than the largest outer diameter $d_R$ of the rotor (the drawing is schematic and is merely for clarifying the dimensional relations).

Figure 1B:
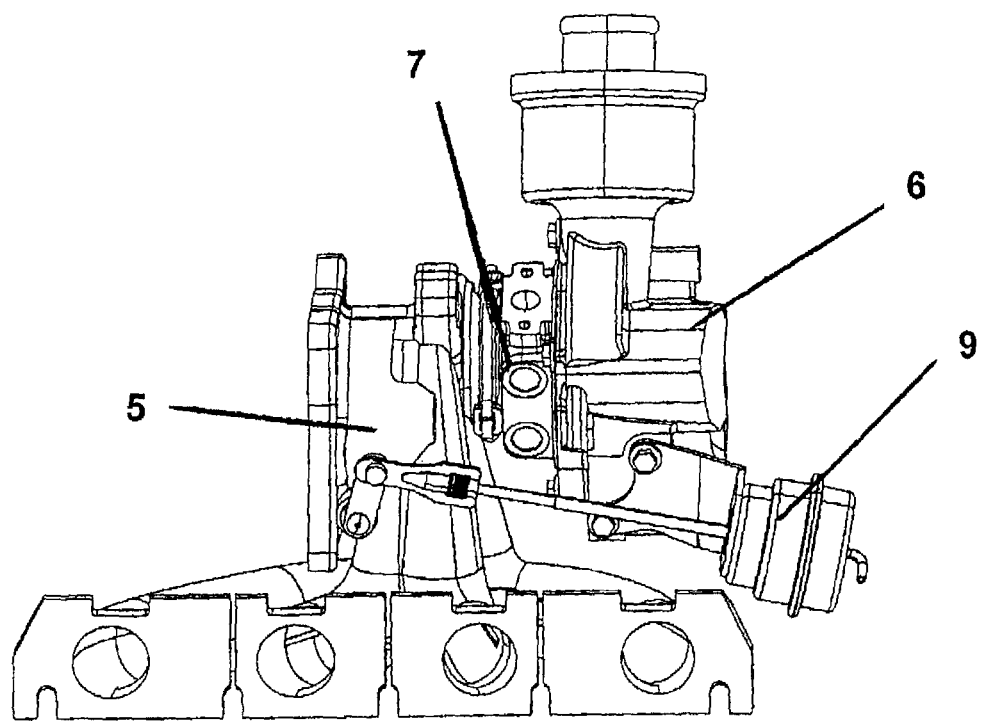
FIG. 1b a view of the turbocharger from FIG. 1a according to A.
Figure 1C:
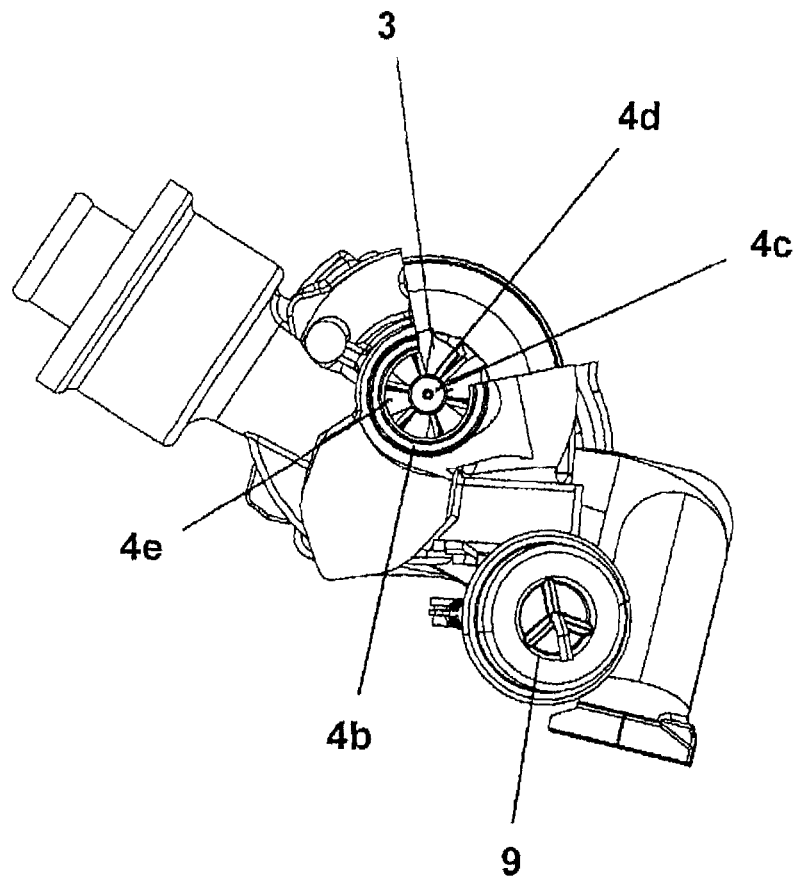
FIG. 1c a view of the turbocharger of FIG. 1a according to B.
Figure 1D:
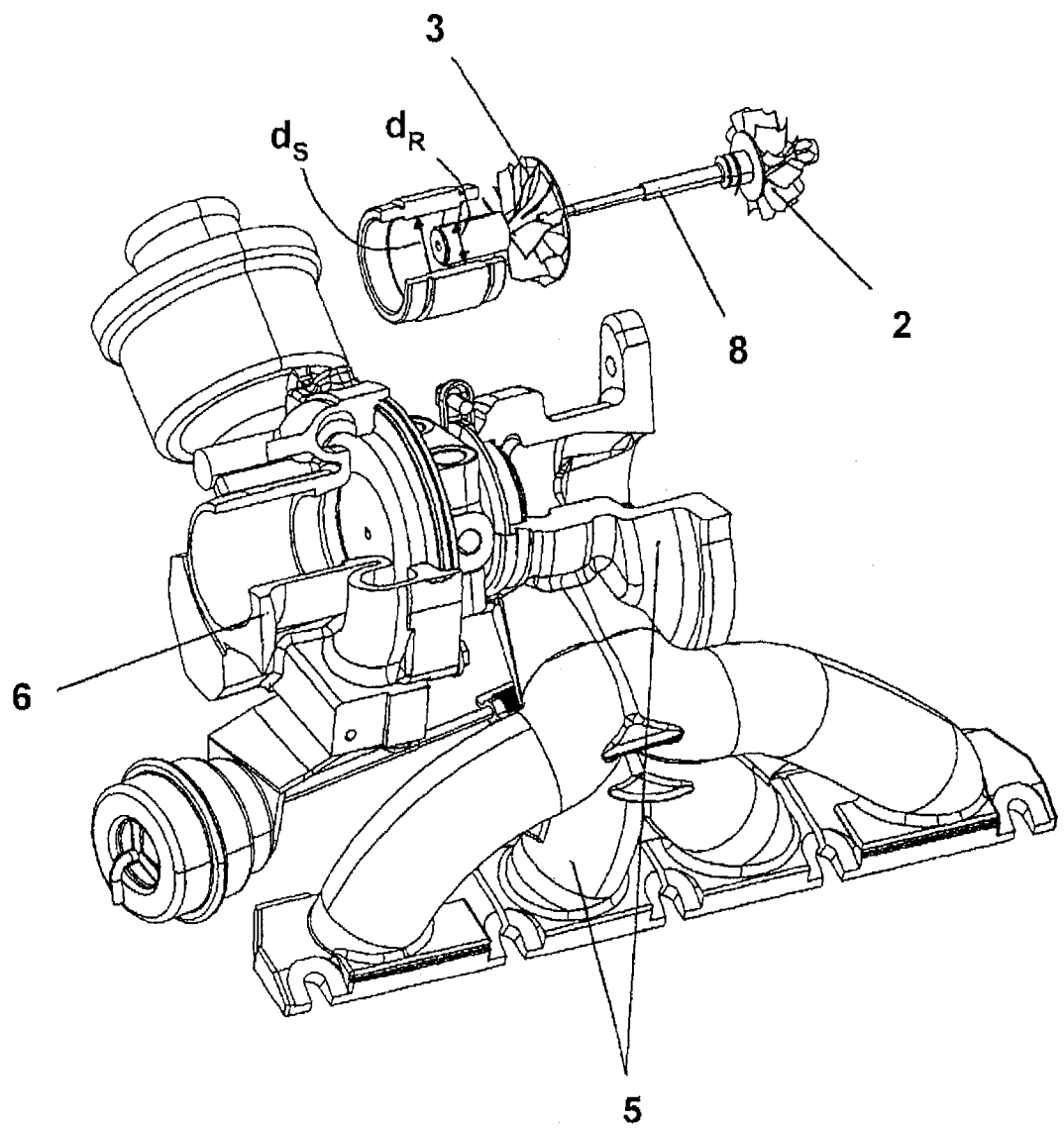

The rotor 4a of the electric motor 4 comprises a rotor magnet 4c which is surrounded by a reinforcement (see e.g. FIG. 1d). Hereby, the reinforcement is designed essentially in a "beaker-like" manner, wherein the base of the beaker is almost completely closed towards the compressor wheel (disregarding a centric assembly bore).

The compressor wheel may (but need not) be of a non-metallic material, here with one embodiment, for example of an unreinforced plastic, the influence of the electromagnetic field of the electric motor is minimised. The rotor magnet 4c in turn is hollow in regions, for placing onto a common shaft with the compressor wheel. Here, a bore 4c of the rotor magnet is accordingly to be seen in FIG. 1d. Furthermore, one may see that in the sequence rotor (consisting of the rotor magnet 4c and reinforcement 4d), compressor wheel 3, shaft 8, turbine wheel 2, a sequence of elements is shown, which minimises a thermal loading of the electric motor. The shaft 8 hereby in the present embodiment is designed such that the turbine wheel 2, compressor wheel 3 as well as rotor 4a are connected to one another in a fixed manner (rotationally fixed), thus are not separable by way of a rotation coupling or free-wheel. However, it is basically possible to provide such a coupling within the framework of the present invention, if for example the mass of the turbine wheel 2 is very high. However, the design effort would be increased once again by way of this.

The nominal voltage of the electric motor 4 in FIG. 1a here is 12V, but however other voltages (for example 48V for hybrid vehicles) is possible.

A turbocharger with a compressor arrangement for compressing fresh air for internal combustion engines is shown in FIG. 1d, and this contains a compressor wheel 3 as well as an electric motor 4 with a rotor 4a and stator 4b, wherein a rotor magnet 4c of the rotor is designed such that it is partially or completely integrated into the compressor wheel, or is connected to this, and the smallest inner diameter of the stator is 1.5 to 8 times as large as the largest outer diameter of the rotor. The arrangement of the rotor magnet, of the stator or of the compressor wheel in the axial direction hereby is variable and for this it is particularly the later FIG. 3a which is referred to. The mass of the rotor magnet 3c (the total mass, even of this is to consist of several parts) here is 50 g. The mass moment of inertia of the rotor magnet with respect to the axis of the rotor is 0.6 kgmm².

The ratio of the cross sectional area of the inlet opening to the cross sectional area of the rotor magnet ($V_{QE}$) is 7:1. The ratio of the cross sectional area of the stator to the cross sectional area of the rotor magnet is for example $V_{QS}$=16:1.

The electric motor may be driven in motor operation (for accelerating and avoiding a "turbohole" as well as in generator operation (for recovery of energy). If the charging pressure (in the turbine housing) reaches a certain nominal value, additional electrical energy is produced whilst using a converter capable of regenerative braking. Ideally, by way of this energetic conversion of the braking energy in generator operation, one may make do without a waste gate/pressure capsule for blowing off an excess exhaust gas, as is represented in FIG. 1b, numeral 9.

The turbocharger according to the invention is used in a drive system according to the invention, for motor vehicles which contain an internal combustion engine connected to the turbocharger, as well as a storage device for electrical energy. The electric motor of the turbocharger 1 hereby is connected to the storage device for electrical energy for the removal of electrical energy in a motor operation of the turbocharger 1 and for feeding electrical energy in a generator operation of the turbocharger. In a particularly preferred embodiment, the electric motor of the turbocharger is connected to an electrical storage device, wherein this electrical storage device is additionally connectable to an electromotive drive of a motor vehicle. This may be a "hub motor" of a motor vehicle or another electric motor which is provided in the drive train of a motor vehicle (for example in the region of the gear). This connection of the electrical turbocharger to a "hybrid" vehicle is particularly energy efficient.

Control electronics for determining the rotational speed of the turbine wheel 2 or compressor wheel 3, actual values of pressure conditions on the turbine housing side and on the compressor housing side, as well as further values which are relevant to the internal combustion engine with respect to the torque, is provided for the efficient control of the drive system or the turbocharger.

The most important components of the first embodiment according to FIGS. 1a to 1d, are shown in FIG. 1d, there at the top right as a part exploded drawing. Here, one may see that it is the case of a turbocharger 1 which comprises a turbine wheel 2 as well as a compressor wheel 3 connected thereto, wherein on the side of the compressor wheel, which is distant to the turbine wheel, an electric motor 4 (consisting of the rotor 4a and stator 4b) is provided, and a rotor 4a of the electric motor 4, which is connected to the compressor wheel 3 in a rotationally fixed manner, is designed in a freely projecting manner.

This "free projecting" is advantageous, since the design effort is reduced with it and for example a static redundancy of the complete mounting is avoided. "Freely projecting" is to be understood as those arrangements with which the rotor is not mounted in a separate and permanent manner. Possibly provided "impact cages" etc., which are to prevent too large a bending of the freely projecting rotor, for example due to bending resonances, are not to be regarded as "bearings" in this context.

Figure 1E:
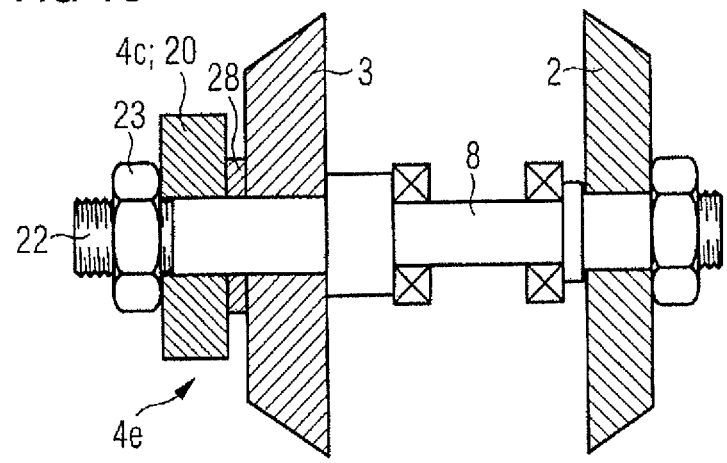
FIG. 1e a schematic representation of a shaft with a compressor wheel and turbine wheel.

FIG. 1e shows a schematic representation of a compressor arrangement according to the invention. Hereby, the shaft 8 is removed separately and the other surrounding components are shown as in FIGS. 1a to 1d.

A turbine wheel 2 is attached on the shaft 8 on the right side and a compressor wheel 3 attached on the left side. Bearings indicated by way of crossed squares are to be seen in the region between the compressor wheel 3 and the turbine wheel 2. On the right side, the turbine wheel is secured by way of a threaded nut, and on the left side the turbine wheel 2 abuts a shoulder of the shaft.

The compressor wheel 3 on the right side abuts a corresponding shoulder of the shaft 8. A spacer element 28 is shown on the left of this. A rotor magnet 4c is shown on the left of this, and this is hollow-cylindrical and is bonded to the shaft 8. Such a material fit is given by way of this bonding, that the rotor magnet 4c co-rotates with the shaft 8 at the same speed. Alternatively the component indicted here may also be a carrier 20 which in its inside holds a rotor magnet 4c. Alternatively the rotor magnet 4c or the carrier 20 may be shrunk onto the shaft 8, and a cottering with the shaft is also possible. Then a thread 22 is shown on the left side, onto which a threaded nut 23 is attached, in order to tighten the rotor magnet or its carrier, the spacer element 28 as well as the compressor wheel 3 such that here no axial play arises.

Figure 1F:
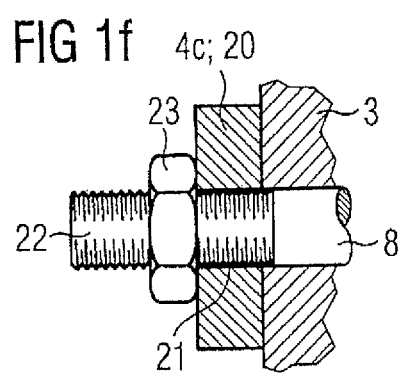
FIGS. 1f to 1h alternative fixation possibilities of a rotor magnet or a carrier of a rotor magnet on a shaft.

FIG. 1f shows an alternative variant with which the compressor wheel 3 is shown on the right side (without spacer element) and the rotor magnet or the carrier 4c or 20 connect directly thereto. Hereby, the shaft 8 is provided with a thread, onto which the rotor magnet 4c or the carrier 20 is screwed. Additionally yet a threaded nut 23 as a lock-nut is screwed on, in order to provide additional axial retention here.

Alternatively to the forms shown here, a for example star-like inner toothing of the carrier 20 or of the rotor magnet 4c may be given, which is stuck onto a complementary outer shape of the shaft 8, in order thus to prevent a rotation.

Apart from the embodiment shown here, the rotor magnet may also be accommodated in the inside of the shaft or accommodated in the extension of the shaft (and this applies to all fastening measures of the rotor magnet or of the carrier with respect to the shaft.

Figure 1G:
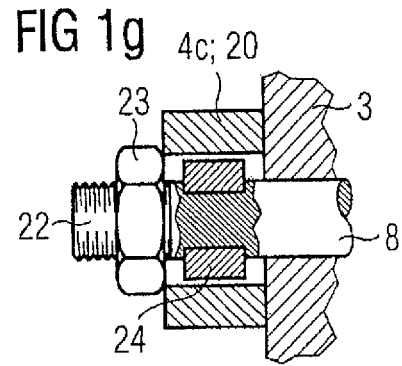

FIG. 1g shows a tongue and groove arrangement 24, with which as a whole two to six keys are shown distributed about the periphery of the shaft, and these keys engage into corresponding grooves of the rotor magnet 4c or of a corresponding carrier 20. The axial securing again is effected here by way of a threaded nut 23 on the thread 22.

Figure 1H:
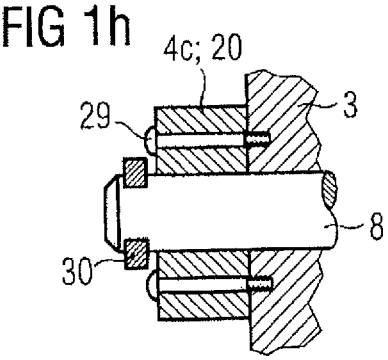

FIG. 1h shows a further fastening form of the carrier 20 or rotor magnet 4c on the compressor wheel 3. Hereby, axial screws 29 are provided, which axially engage into the compressor wheel 3 (the screws 29 run parallel to the shaft 8). For safety, a securing ring 30 is shown once again, which additionally axially secures the arrangement.

Figure 1I:
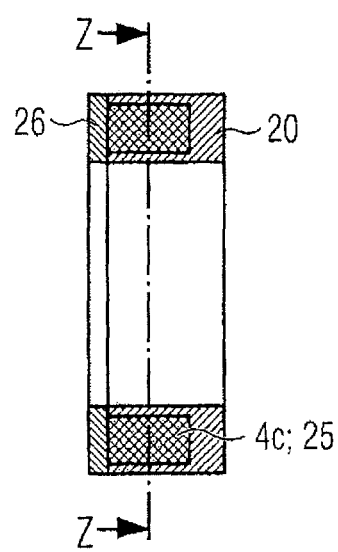
FIGS. 1i and 1k sections of a carrier equipped with rotor magnets.
Figure 1K:
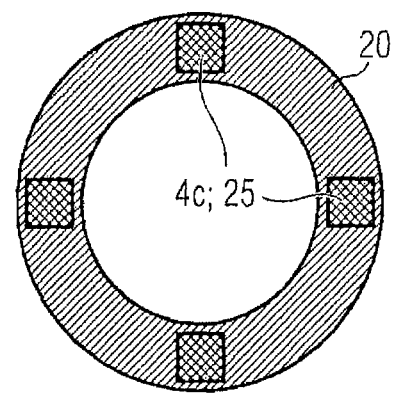

FIG. 1i shows a cross section of a carrier 20 with a cover 26 placed on. Hereby, in each case individual rotor magnets 4c are incorporated into cavities 25 of the carrier 20. These rotor magnets are uniformly distributed over the periphery of the carrier 20, as is to be seen from the section according to Z-Z from FIG. 1k.

A cover 26 hereby is not absolutely necessary, but the cavities 25 may also be designed in an open manner in the axial direction.

Figure 1L:
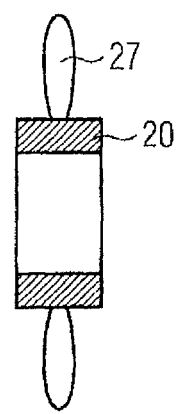
FIG. 1l a schematic view of a carrier for rotor magnets, which comprises wings on the outer sides for precompression.

FIG. 1l shows a carrier 20 with radially integrally formed wings 27. By way of this, an additional compressor stage to the actual compressor wheel may be obtained, i.e. the carrier here has an additional function in the form of air compression, additionally to the function of carrying the rotor magnet or magnets 4c.

Here, the carrier 20 is manufactured of plastic injection moulding, however here metal injection moulding or other material is also possible.

FIG. 1m shows a compressor wheel 3 with a left-side continuation 3a in the form of a shaft. A hollow-cylindrical rotor magnet or carrier 4c or 20 is attached and bonded and/or shrunk onto this continuation. The compressor wheel itself is shrunk onto a shaft 8 and additionally secured by a threaded nut 23 on the thread 22.

The arrangement shown in FIG. 1e represents a compressor arrangement for compressing fresh air for combustion engines, containing a compressor wheel 3, as well as an electric motor 4 with at least one rotor 4a containing a rotor magnet 4c, and with at least one stator 4b as well as rotor gap between the rotor 4a and the stator 4b, wherein the rotor gap is designed such that with a rotating compressor wheel, at least 90% of the air mass flow to be compressed is led through the rotor gap, wherein the compressor wheel 3 is fastened on the shaft 8 and at least one rotor magnet 4c or a carrier 20 for holding the rotor magnet may be assembled onto the shaft 8 as a separate component and bonded to this and subsequently is secured by way of a nut 23 on a thread 22 of the shaft.

Alternatively, it may also be the case of an arrangement with which the smallest inner diameter of the stator is 1.2 to 10 times, here 2 times as large as the largest outer diameter of the rotor (see introductory description for the definition of these details).

In another alternative form, a media inlet opening may be given between the stator and the rotor, and in at least one cross section of the electric motor, the ratio of the cross sectional area of the inlet opening 4e to the cross sectional area of the rotor magnet 4c lies between 0.5 and 100 here at 5.

Figure 2A:
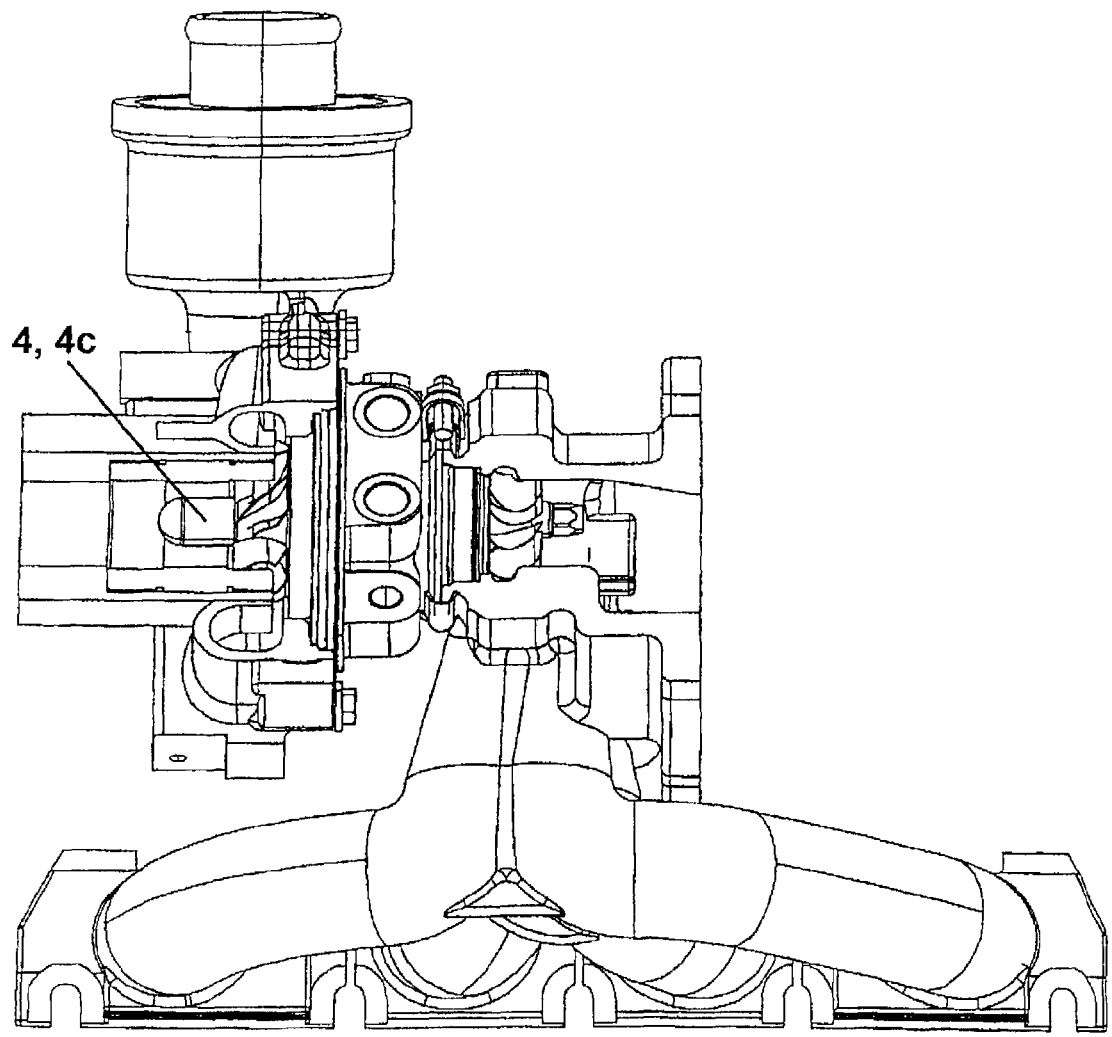
FIG. 2a a further embodiment of a turbocharger according to the invention, in a part section.
Figure 2B:
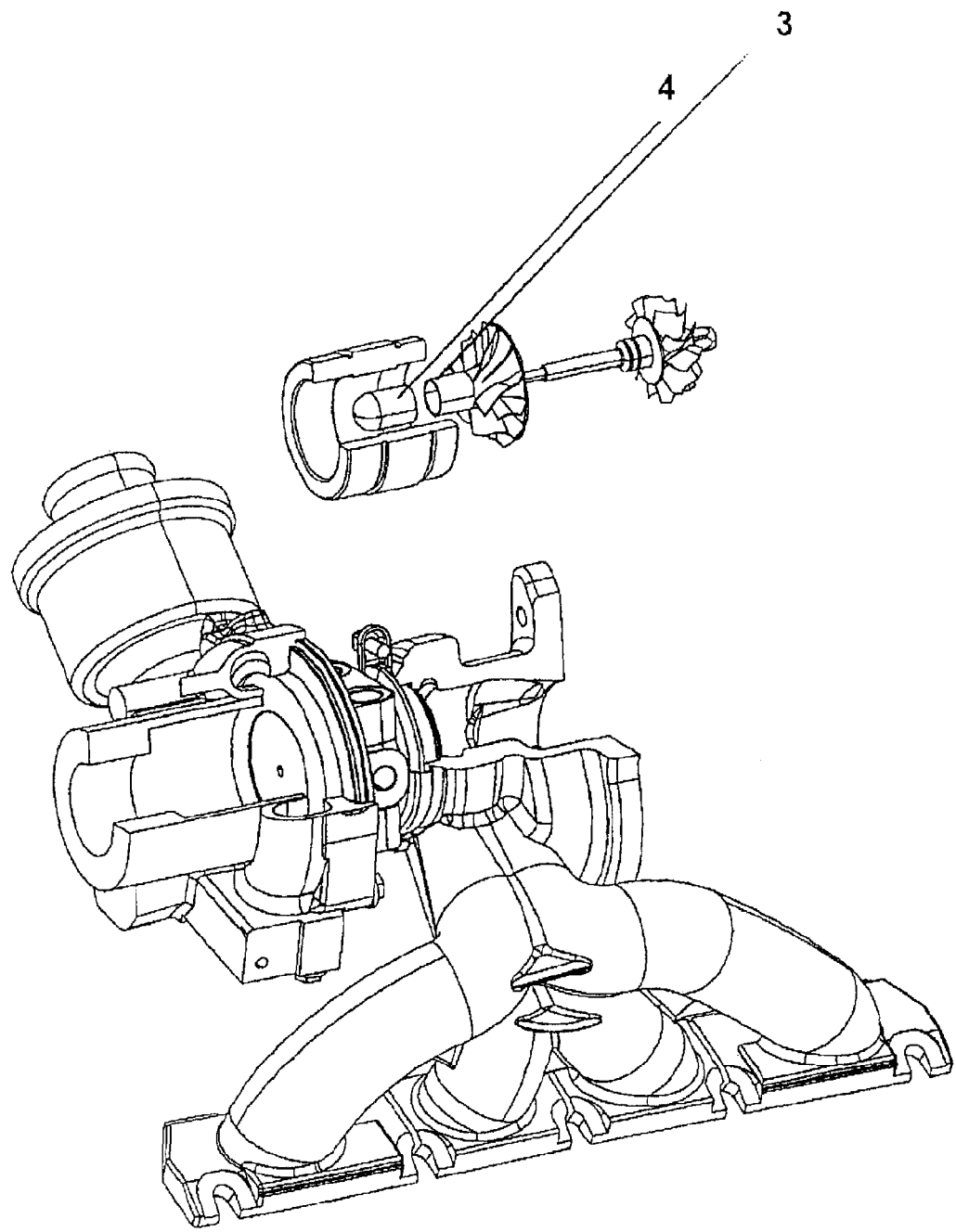

A further embodiment is shown in the FIGS. 2a and 2b. Hereby, the rotor magnet 4c on manufacture has been partially integrated into the compressor wheel 3. The stator forms the inner contour of the compressor housing.

The electric motor may be operated in motor operation for accelerating and avoiding a "turbohole" as well as in generator operation (for recovery of energy). If the charging pressure (in the turbine housing) reaches a certain nominal value, then additional energy is produced whilst using a converter capable of regenerative braking. In this design variant one may make do without a wastegate and a pressure capsule for blowing off excess exhaust has, as is shown in FIG. 1b numeral 9, due to the energetic conversion of the braking energy in generator operation.

Figure 3A:
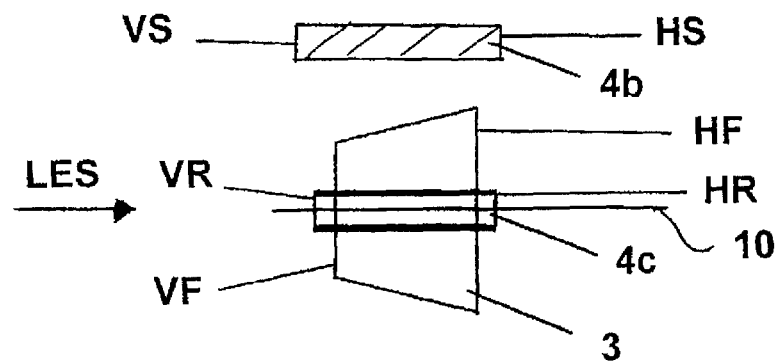
FIG. 3a an explanation of the proportions and arrangement of the rotor magnet, stator and compressor wheel.

FIG. 3a shows a schematic representation of the compressor wheel 3, the stator 4b as well as the rotor 4c for illustrating the geometric conditions. What is shown is the compressor wheel which is mounted on an axis 10 on one side or on both sides, and is subjected to flow in an air inlet flow direction LES. The air flow which flows in is accelerated by the compressor wheel 3 which has a conveyor structure F. The front edge of the conveyor structure is indicated by VF and the rear edge of the conveyor structure is indicated by HF. The front edge of the rotor magnet 4c is indicated at VR and the rear edge of the rotor magnet 4c at HR. The front edge of the stator is indicated at VS and the rear edge of the stator is indicated at HS (the stator here is rotationally symmetrical but however for the purpose of a better overview, the upper stator section is shown). The compressor wheel 3 thus has a conveyor structure F in the form of blades, wherein the front edges VF of the conveyor structure, in the air inlet flow direction, lie downstream with respect to a magnetically effective front edge of the rotor magnet 4c and of a magnetically effective front edge VS of the stator. The compressor wheel with its rear edge HF in contrast lies in the air inlet flow direction lies downstream with respect to the rear edge HR of the rotor magnet 4c as well as the rear edge of the stator 4b.

Here however, also other arrangements are possible, with which the rotor magnet or the stator project merely beyond one edge of the compressor wheel. It is also possible for the rotor magnet to lie completely within the compressor wheel and thus is enclosed laterally of edges of the conveyor structure.

Figure 3B:
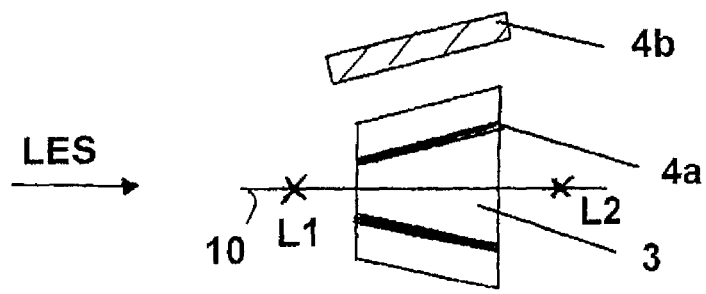
FIG. 3b one embodiment of a compressor wheel with an inclined rotor and inclined stator.

FIG. 3b shows a further embodiment, with which the stator 4b (this is rotationally symmetrical with respect to the axis 10) is inclined with respect to the axis 10. The stator here thus has an essentially hollow truncated cone-shape. The same also applies to the rotor 4a or to the corresponding rotor magnets, and this with its sections is also inclined with respect to the axis 10 (thus not parallel/collinear, but would intersect this in the extension).

The compressor wheel shown in FIG. 3b is mounted on both sides (see indicated bearing locations L1 and L2). However, the embodiments of the figures may in principle also be mounted on both sides (even if this, under certain circumstances, entails an increased effort with regard to construction).

It is the case for FIG. 3b that the rotor magnet 4c is arranged radially outside the hub of the compressor wheel 3 with respect to the axis 10 of the compressor wheel 3. The compressor wheel hereby is designed such that air may be led radially inside as well as radially outside the rotor magnet. Hereby, the compressor wheel is designed such that at least 70% of the supplied air mass (or of the supplied air mass flow) is led radially outside the rotor magnet.

Figure 4A:
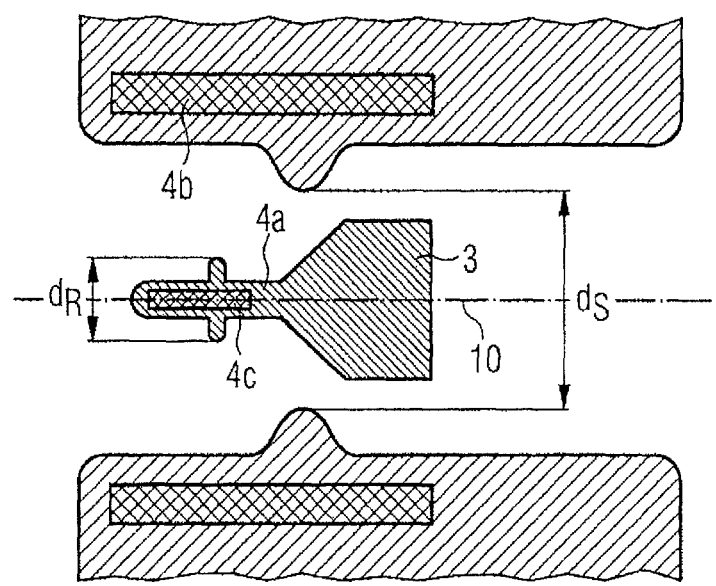
FIGS. 4a to 4c an explanation of geometric conditions on turbochargers according to the invention.
Figure 4B:
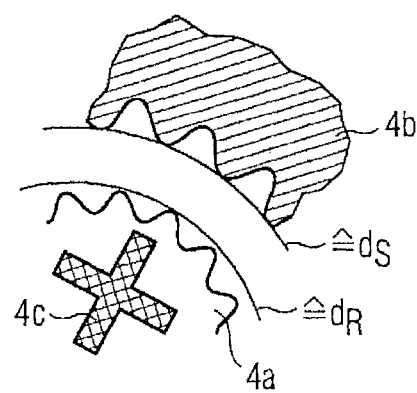

FIGS. 4a and 4b serve for illustrating the evaluation of the diameter dimensions with geometries which are not the same shape all the way through.

FIG. 4a makes it clear that the largest diameter $d_R$ of the rotor is measured at the location at which this rotor (but only in the region of the extension of the rotor magnet) has its largest extension. A later rotor widening in the region of the compressor wheel 3 is not taken into account, since the rotor magnet is not led further there.

Accordingly, the stator is also measured at the narrowest location (see $d_S$) over which the corresponding electrically or magnetically effective component of the stator (indicated by the black bar of the one laminated core with copper wire) extends.

FIG. 4b shows a more detailed illustration for non-round cross sections. "Largest outer diameter" of the rotor is meant as the diameter which describes the smallest circumscribing circle around the complete rotor (see above, description with regard to 4a, for the axial positioning). The waved outer line shown in FIG. 4b is not circularly round and the circumscribing circle is tangent essentially to projecting locations of the outer rotor.

The same applies to the stator 4b, which likewise has a circularly round shape. Here the largest inscribed circle is assumed as diameter $d_S$.

FIG. 4c once again describes a cross section through a stator 4b and rotor 4a, according to the invention. Here, one may see a rotor magnet 4c which consists of individual segments (three distributed over the periphery). Alternatively to this, of course a e.g. cylindrical individual magnet is conceivable. A reinforcement 4d is attached around this rotor magnet 4c. In turn, a conveyor structure F (here in section, thus hatched) is shown on this reinforcement. An air passage or media passage opening 4e is given around the conveyor structure, and this is surrounded radially to the outside by a shielding 11 (this is of plastic and is magnetically/electrically insulating). The electrically effective part of the stator 4b is given around the shielding 11.

Figure 4C:
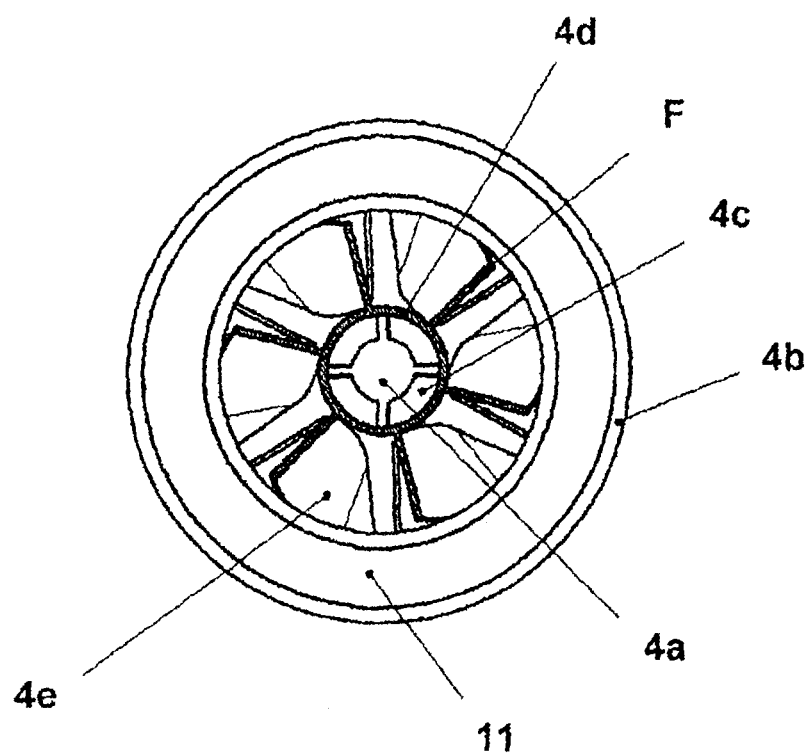

In the cross section shown in FIG. 4c, the cross sectional area of the media passage opening or of the air passage or the inlet opening 4e to the cross sectional area of the four segments of the rotor magnet (defined as $V_{QE} = A_{inlet\ opening} / A_{rotor\ magnet}$)=4:1.

The inlet opening 4e hereby is defined as the actual opening capable of being subjected to throughflow, thus the area content within the reinforcement 11, but minus the areas of the hatched conveyor structure as well as of the hub of the rotor (the hub encompasses the reinforcement 4d as well as that which is located therein). What is meant here is therefore the "net cross sectional area" of the inlet opening. The cross section in FIG. 5c runs visibly through the electrically and magnetically effective section of the stator 4b. In this cross section, the ratio of the cross sectional area of the stator to the cross sectional area of the rotor magnet (defined as $V_{QS} = A_{stator} / A_{rotor\ magnet}$)=13:1.

Here, it is only the electrically and magnetically effective part (thus core metal+copper wire, however minus copper wire coating as well as possible "hollow areas") which is to be understood as the cross sectional area of the stator. The same applies to the rotor magnet and here only the cross sections of the pure rotor magnet segments are to be used in this cross section.

The relations mentioned above for the relation of the smallest inner diameter of the stator to the largest outer diameter of the rotor (additionally to 1.5 to 8 fold) may also lie in other intervals, specifically 1.1 fold to 1.49 fold, preferably 1.25 fold to 1.49 fold. Accordingly however, at the other end of the scale, also the smallest inner diameter of the stator may be 8.01 to 15 times, preferably 8.01 to 12 times larger than the largest outer diameter of the rotor.

All turbochargers shown in the figures contain at least one compressor wheel 3 for compressing air, and may be driven with the electric motor 4, wherein a rotor gap is arranged between the rotor 4a and the stator 4b of the electric motor, and at least 50%, preferably at least 90% of the air mass flow fed to the compressor wheel is led through the rotor gap in at least one operating condition of the turbocharger. With the representations in the figures, this operating condition is given at a rotational speed between 5000 and 300000 rpm, preferably between 40000 and 200000 rpm, here at 100000 rpm. The rotational speed of the crank shaft of a connected reciprocating internal combustion engine hereby is between 100 and 15000 rpm, preferably between 1500 and 8000 rpm, here for example 2500 rpm.

Figure 5:
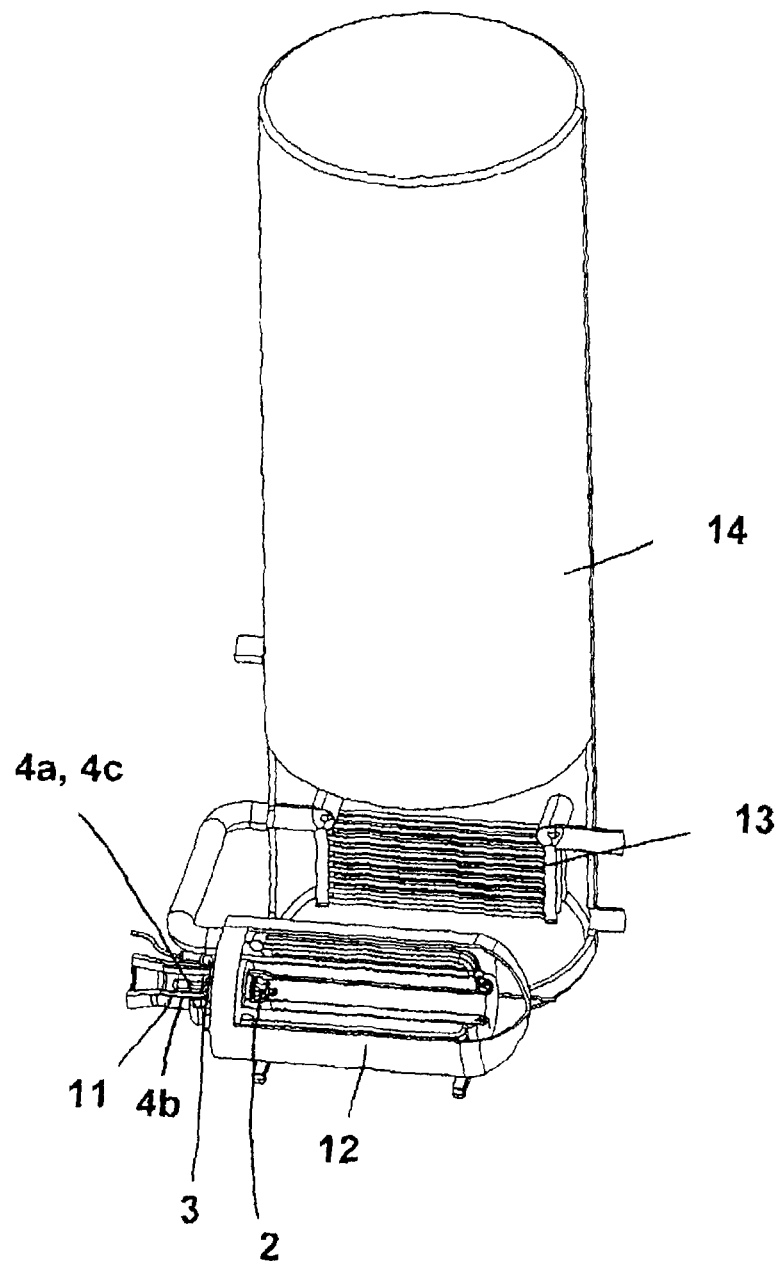
FIGS. 5 and 6 a further embodiment of a turbocharger according to the invention, as a microturbine for energy recovery.
Figure 6:
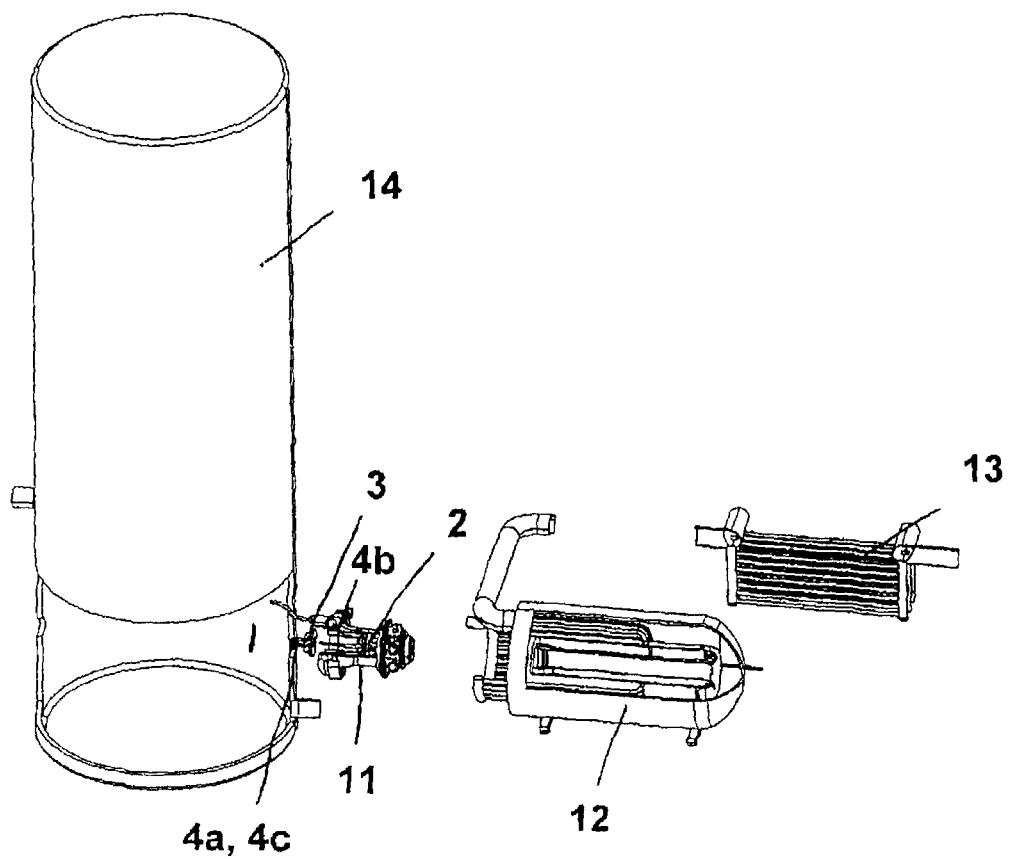

FIGS. 5 and 6 show the turbocharger according to the invention as a base module of a microturbine for the combined heat and power coupling. FIG. 5 shows the basic construction, FIG. 6 shows an illustrative exploded view. An electric motor/generator is indicated with the reference numeral 11, a recuperator with the reference numeral 12, a heat exchanger with the reference numeral 13 and a heat storage device with the reference numeral 14. For this reason, the important parts (rotor, stator compressor wheel, turbine wheel) are indicated in the figures with the same reference numerals as the previous embodiment examples. The manner of functioning, formulated in other words, is as follows (what is important is primarily not the function of the combined heat and power coupling but the fact that the turbocharger according to the invention, which here shows a compressor wheel and a turbine wheel, may also be applied outside an automobile).

The combustion air flows completely between the rotor and stator of the electric motor/generator 11, into the compressor. The combustion air is already heated to approx. 200° C. due to the compression to approx. 4 bar which is effected there. From the compressor, the heated combustion air is led into a first heat exchanger and lifted to a temperature level of approx. 500° C. by way of the exhaust gases which flow past. In a combustion chamber which is arranged thereafter, the combustion air is combusted together with a fuel, e.g. a regenerative gas. The hot gases which thus arise are expanded in the turbine and drive the turbine wheel and the compressor and the generator. The heat energy of the exhaust gas in the heat exchanger is partly released directly again to the compressed combustion air. Moreover, this turbocharger according to the invention may be coupled to a second heat exchanger, in order to utilise the complete residual heat, for producing warm water or to lead it to a heating circuit e.g. for the temperature control of buildings. The generator may be used as an electric motor for starting the process. Thus with the turbocharger according to the invention, one may for example produce inexpensive small combined heat and power plants, whose essential components consist of large-scale manufactured parts from the automobile industry. The noise emission as well as the body sound transmission into adjacent buildings is avoided on account of the low-oscillation running. The module is also suitable as an auxiliary drive for electricity production in aircrafts due to the compact construction manner.

The invention claimed is:

1. A compressor arrangement for compressing fresh air for an internal combustion engine, comprising:
   a rotating compressor wheel; and
   an electric motor including at least one rotor containing at least one rotor magnet and at least one stator, the motor having at least one rotor gap between the rotor and the stator, the rotor gap being configured so that with the compressor wheel rotating, at least 50% of an entirety of an air mass flow led to the compressor wheel is led through the rotor gap,
   wherein the compressor wheel is one of (a) fastened on a shaft and (b) contains the shaft, and
   wherein one of the rotor magnet and a carrier for holding the rotor magnet, as a separate component, is one of (i) assembled onto the shaft via one of a screwing, pressing, cottering, bonding, soldering, welding, peripherally injecting, shrinking onto and shrinking into the shaft and (ii) non-rotatably secured onto the shaft via a positive fit.

2. The arrangement according to claim 1, wherein at least 90% of the entirety of the air mass flow led to the compressor wheel is led through the rotor gap.

3. The arrangement according to claim 1, wherein 100% of the air mass flow led to the compressor wheel is led through the rotor gap.

4. The arrangement according to claim 1, wherein the compressor wheel is fastened to the shaft which further carries a turbine wheel.

5. The arrangement according to claim 2, wherein the mounting of the shaft is arranged between the compressor wheel and the turbine wheel.

6. The arrangement according to claim 1, wherein the shaft includes a thread screwing at least one of the compressor wheel, the rotor magnet and the carrier.

7. The arrangement according to claim 1, wherein the shaft includes a thread attaching at least one of (a) a threaded nut for at least one of jamming and securing, (b) the compressor wheel, (c) the rotor magnet and (d) the carrier.

8. The arrangement according to claim 1, wherein the positive fit of at least one of the compressor wheel, the rotor magnet and the carrier consists of an inner toothing which is complementary to an outer toothing of the shaft.

9. The arrangement according to claim 1, wherein the positive fit of at least one of the compressor wheel, the rotor magnet and the carrier and the positive fit of the shaft is provided by a tongue and groove connection.

10. The arrangement according to claim 1, further comprising:
   a spacer element arranged in an axial direction between (a) the compressor wheel and (b) at least one of the rotor magnet, the carrier and a threaded nut.

11. The arrangement according to claim 1, wherein (a) the compressor wheel and (b) at least one of the rotor magnet and the carrier are screwed to one another in at least one of an axial direction and a radial direction.

12. The arrangement according to claim 1, wherein at least one of the rotor magnet and the carrier are secured against at least one of a radial displacement and an axial displacement using at least one cotter pin.

13. The arrangement according to claim 1, wherein the carrier is made of one of plastic and metal.

14. The arrangement according to claim 1, wherein the carrier includes at least one cavity for inserting the rotor magnet.

15. The arrangement according to claim 1, wherein the carrier includes a plurality of cavities for inserting a corresponding rotor magnet of the at least one rotor magnet, the cavities being arranged radially around the shaft.

16. The arrangement according to claim 1, wherein the carrier is at least one of (a) axially open for receiving the rotor magnet and (b) includes a cover for an axial closure of the rotor magnet.

17. The arrangement according to claim 1, wherein the shaft is configured as a continuation of the compressor wheel and wherein at least one of the rotor magnet and the carrier are arranged on the shaft in a non-rotatable manner.

18. The arrangement according to claim 1, wherein the shaft is stepped for forming an at least one-sided axial abutment for at least one of the rotor magnet and the carrier.

19. The arrangement according to claim 1, further comprising:
a turbine wheel connected to the compressor wheel, wherein the electric motor is arranged on a side of the compressor wheel, the side being distant to the turbine wheel.

20. A compressor arrangement for compressing fresh air for an internal combustion engine, comprising:
a rotating compressor wheel; and
an electric motor including a rotor and a stator,
wherein the rotor includes at least one rotor magnet, a smallest inner diameter of the stator being 1.2 to 10 times as large as a largest outer diameter of the rotor, wherein a rotor gap between the rotor and the stator forms an air inlet opening for the compressor wheel, the air inlet opening being the only air inlet opening that leads air to the compressor wheel,
wherein the compressor wheel is one of (a) fastened on a shaft and (b) includes the shaft, and
wherein one of the rotor magnet and a carrier for holding the rotor magnet, as a separate component, is one of (i) assembled on the shaft via one of a screwing, tottering, bonding and shrinking onto the shaft and (ii) non-rotatably secured on this shaft via a positive fit.

21. A compressor arrangement, comprising:
an electric motor including a stator, a rotor with a rotor magnet and a media passage opening between the stator and the rotor,
wherein in at least one cross section of the electric motor, the cross section is perpendicular to an axis of a compressor wheel, a ratio of a cross sectional area of an inlet opening to a cross sectional area of the rotor magnet being between 0.5 and 100,
wherein the media passage opening between the stator and the rotor is the only air inlet opening that leads air to the compressor wheel,
wherein the compressor wheel is one of (a) fastened on a shaft and (b) includes the shaft and
wherein one of the rotor magnet and a carrier for holding the rotor magnet, as a separate component, is one of (i) assembled onto the shaft via a screwing, cottering, bonding and shrinking onto the shaft and (ii) non-rotatably secured to the shaft via a positive fit.

22. The arrangement according to claim 21, wherein the ratio is between 0.8 and 50.

23. The arrangement according to claim 21, wherein the ratio is between 2 and 20.

24. The arrangement according to claim 1, wherein the rotor gap is the only air inlet opening that leads air to the compressor wheel.

25. The arrangement according to claim 1, wherein the rotor gap is formed by the outer diameter of the rotor and the inner diameter of the stator.

26. The arrangement according to claim 1, wherein the compressor wheel and the rotor are axially disposed on the shaft behind one another.

27. A method for operating an arrangement according to claim 1, comprising:
leading at least 50% of an entirety of a air mass flow to a compressor wheel through a rotor gap.

28. A method for operating an arrangement according to claim 1, comprising:
leading air to a compressor wheel only through a rotor gap.

* * * * *